(12) United States Patent
De La Riviere et al.

(10) Patent No.: US 9,786,090 B2
(45) Date of Patent: Oct. 10, 2017

(54) SYSTEM FOR COLOCATING A TOUCH SCREEN AND A VIRTUAL OBJECT, AND DEVICE FOR MANIPULATING VIRTUAL OBJECTS IMPLEMENTING SUCH A SYSTEM

(75) Inventors: Jean-Baptiste De La Riviere, Bordeaux (FR); Christophe Chartier, Bordeaux (FR); Martin Hachet, Bordeaux (FR); Benoit Bossavit, Cours de Pile (FR); Gery Casiez, Roost Warendin (FR)

(73) Assignees: INRIA—INSTITUT NATIONAL DE RECHERCHE EN INFORMATIQUE ET EN AUTOMATIQUE, Le Chesnay (FR); IMMERSION, Bordeaux (FR)

( * ) Notice: Subject to any disclaimer, the term of this patent is extended or adjusted under 35 U.S.C. 154(b) by 124 days.

(21) Appl. No.: 14/126,594

(22) PCT Filed: Jun. 15, 2012

(86) PCT No.: PCT/EP2012/061429
§ 371 (c)(1),
(2), (4) Date: Feb. 10, 2014

(87) PCT Pub. No.: WO2012/172044
PCT Pub. Date: Dec. 20, 2012

(65) Prior Publication Data
US 2014/0204079 A1    Jul. 24, 2014

(30) Foreign Application Priority Data

Jun. 17, 2011 (FR) .................................. 11 55341

(51) Int. Cl.
*G06T 15/00* (2011.01)
*G06F 3/01* (2006.01)
(Continued)

(52) U.S. Cl.
CPC ........ *G06T 15/005* (2013.01); *G02B 27/2235* (2013.01); *G06F 3/011* (2013.01);
(Continued)

(58) Field of Classification Search
CPC .............. G06T 15/005; G02B 27/2235; H04N 13/004; G06F 3/04815; G06F 3/04883; G06F 3/011
See application file for complete search history.

(56) References Cited

U.S. PATENT DOCUMENTS 2,336,508 A * 12/1943 MacLean ............... G03B 21/00
352/89
2,552,272 A * 5/1951 Fultz .................. G02B 21/0016
353/39

(Continued)

FOREIGN PATENT DOCUMENTS

FR          2947348 A1 * 12/2010    ......... G02B 27/2271

OTHER PUBLICATIONS

Mulder J D, "Realistic occlusion effects in mirror-based co-located augmented reality systems", Virtual Reality, 2005. Proceedings VR 2005, IEEE Bonn, Germany Mar. 12-16, 2005, Piscataway, NJ, USA, IEEE, Piscataway, NJ, USA, Mar. 12, 2005 (Mar. 12, 2005), pp. 203-208, XP031572879.

(Continued)

*Primary Examiner* — Devona E Faulk
*Assistant Examiner* — Charles L Beard
(74) *Attorney, Agent, or Firm* — Young & Thompson (57) ABSTRACT

A system (10) for displaying at least one virtual object includes a secondary screen (20) for displaying the virtual object, a primary screen (30), an optical element for overlaying images displayed on the secondary screen (20) with images displayed on the primary screen (30), and a pointing surface combined with the primary screen (30) for detecting (Continued)

the contact of one or more physical pointing elements. A device (90) for manipulating at least one virtual object includes calculation elements for generating images of the virtual object displayed on the system (10) from information output from the system (10) in accordance with the actions of the operator (100).

15 Claims, 4 Drawing Sheets

(51) Int. Cl.
 *G06F 3/0481* (2013.01)
 *G02B 27/22* (2006.01)
 *H04N 13/00* (2006.01)
 *G06F 3/0488* (2013.01)

(52) U.S. Cl.
 CPC ...... *G06F 3/04815* (2013.01); *G06F 3/04883* (2013.01); *H04N 13/004* (2013.01)

(56) References Cited

U.S. PATENT DOCUMENTS

| | | | | |
|---|---|---|---|---|
| 4,837,734 A * | 6/1989 | Ichikawa | G05B 19/427 | 414/1 |
| 5,394,202 A * | 2/1995 | Deering | G02B 27/0093 | 345/419 |
| 5,502,481 A * | 3/1996 | Dentinger | G02B 27/0093 | 348/51 |
| 5,781,229 A * | 7/1998 | Zediker | H04N 5/74 | 250/206.1 |
| 5,973,678 A * | 10/1999 | Stewart | G06F 3/016 | 318/561 |
| 5,999,185 A * | 12/1999 | Kato | G06F 3/011 | 345/420 |
| 6,084,556 A * | 7/2000 | Zwern | G09B 21/008 | 345/158 |
| 6,267,599 B1* | 7/2001 | Bailey | A61B 34/76 | 345/156 |
| 6,710,797 B1* | 3/2004 | McNelley | G02B 27/2292 | 348/14.08 |
| 6,822,643 B2* | 11/2004 | Matsui | G06F 3/011 | 345/157 |
| 6,963,792 B1* | 11/2005 | Green | A61B 1/00193 | 348/E13.014 |
| 7,134,756 B2* | 11/2006 | Drucker | G03B 21/28 | 348/E5.137 |
| 7,724,242 B2* | 5/2010 | Hillis | G06F 3/011 | 178/18.01 |
| 7,777,762 B2* | 8/2010 | Katano | G06T 17/00 | 345/421 |
| 7,812,815 B2* | 10/2010 | Banerjee | G06F 3/011 | 345/156 |
| 7,843,429 B2* | 11/2010 | Pryor | G06F 3/042 | 345/158 |
| 8,098,263 B2* | 1/2012 | Noro | G06F 3/014 | 345/619 |
| 8,159,521 B2* | 4/2012 | Ferren | H04L 12/1827 | 348/14.08 |
| 8,208,007 B2* | 6/2012 | White | H04N 7/144 | 348/14.08 |
| 8,217,995 B2* | 7/2012 | Dobbins | G06F 3/011 | 345/474 |
| 8,248,462 B2* | 8/2012 | Peterka | G02B 27/0093 | 345/19 |
| 8,350,897 B2* | 1/2013 | Endo | G06F 3/011 | 345/633 |
| 8,520,027 B2* | 8/2013 | Itkowitz | G06T 15/503 | 345/633 |
| 8,599,239 B2* | 12/2013 | White | H04N 7/144 | 348/14.08 |
| 8,643,569 B2* | 2/2014 | Vesely | G06F 3/011 | 345/156 |
| 8,730,156 B2* | 5/2014 | Weising | G09G 5/08 | 345/156 |
| 8,760,391 B2* | 6/2014 | Hawkins | G06F 3/011 | 178/18.01 |
| 8,799,821 B1* | 8/2014 | De Rose | G06F 3/04842 | 715/821 |
| 8,854,802 B2* | 10/2014 | Robinson | G06F 1/1615 | 349/74 |
| 8,868,373 B2* | 10/2014 | Eng | A61F 4/00 | 128/899 |
| 8,933,912 B2* | 1/2015 | Ambrus | G02B 27/0093 | 178/18.09 |
| 8,947,455 B2* | 2/2015 | Friesen | G06F 3/011 | 345/633 |
| 9,099,015 B2* | 8/2015 | Liang | G06T 19/00 | |
| 9,152,226 B2* | 10/2015 | Forutanpour | G06F 3/011 | |
| 9,164,581 B2* | 10/2015 | Robinson | G06F 3/04815 | |
| 9,202,306 B2* | 12/2015 | Vesely | G06T 15/00 | |
| 9,202,309 B2* | 12/2015 | Winnemoeller | G06T 15/80 | |
| 9,207,756 B2* | 12/2015 | Yi | G06F 3/011 | |
| 9,241,767 B2* | 1/2016 | Prisco | B25J 9/1674 | |
| 9,265,458 B2* | 2/2016 | Stack | A61B 5/162 | |
| 9,299,183 B2* | 3/2016 | Vesely | G06F 3/012 | |
| 9,380,295 B2* | 6/2016 | Dolim | H04N 13/0468 | |
| 9,402,688 B2* | 8/2016 | Min | A61B 34/30 | |
| 9,430,038 B2* | 8/2016 | Ebstyne | G06F 3/011 | |
| 9,489,102 B2* | 11/2016 | Samadani | G06F 3/048 | |
| 9,513,716 B2* | 12/2016 | Song | G06F 3/033 | |
| 9,529,424 B2* | 12/2016 | Hilliges | G06F 3/011 | |
| 9,563,266 B2* | 2/2017 | Banerjee | G06F 3/011 | |
| 9,582,091 B2* | 2/2017 | Kim | G06F 3/04886 | |
| 9,630,105 B2* | 4/2017 | Stafford | A63F 13/212 | |
| 9,632,593 B2* | 4/2017 | Kasahara | G06F 3/0346 | |
| 2003/0234766 A1* | 12/2003 | Hildebrand | G06F 1/1626 | 345/168 |
| 2004/0165060 A1* | 8/2004 | McNelley | H04N 7/144 | 348/14.08 |
| 2005/0041286 A1* | 2/2005 | White | G02B 3/0056 | 359/452 |
| 2005/0165303 A1* | 7/2005 | Kleen | A61B 5/0071 | 600/424 |
| 2005/0227761 A1* | 10/2005 | Yoshino | H04N 21/4781 | 463/30 |
| 2005/0237382 A1* | 10/2005 | White | H04N 7/144 | 348/14.16 |
| 2005/0285853 A1* | 12/2005 | Morita | G06F 3/04815 | 345/419 |
| 2006/0181519 A1* | 8/2006 | Vernier | G06F 3/04886 | 345/173 |
| 2006/0256036 A1* | 11/2006 | Katano | G06F 3/012 | 345/7 |
| 2006/0256110 A1* | 11/2006 | Okuno | G02B 27/00 | 345/419 |
| 2007/0006091 A1* | 1/2007 | Sakagawa | G06T 15/60 | 715/771 |
| 2007/0024590 A1* | 2/2007 | Krepec | G06F 3/0425 | 345/173 |
| 2007/0035511 A1* | 2/2007 | Banerjee | G06F 3/016 | 345/156 |
| 2007/0085828 A1* | 4/2007 | Schroeder | G06F 3/043 | 345/158 |
| 2007/0109296 A1* | 5/2007 | Sakagawa | G06F 3/04815 | 345/419 |
| 2007/0196004 A9* | 8/2007 | Green | A61B 34/76 | 382/128 |
| 2007/0279435 A1* | 12/2007 | Ng | G06F 3/011 | 345/624 |
| 2007/0279436 A1* | 12/2007 | Ng | G06T 19/00 | 345/624 |
| 2007/0287902 A1* | 12/2007 | Fuimaono | A61B 5/055 | 600/300 |
| 2007/0291008 A1* | 12/2007 | Wigdor | G06F 1/1613 | 345/173 |
| 2008/0012936 A1* | 1/2008 | White | H04N 7/144 | 348/14.16 |

(56) References Cited

U.S. PATENT DOCUMENTS

| | | | | |
|---|---|---|---|---|
| 2008/0129704 A1* | 6/2008 | Pryor | G06F 3/011 | 345/173 |
| 2008/0143895 A1* | 6/2008 | Peterka | G02B 27/0093 | 349/15 |
| 2008/0297535 A1* | 12/2008 | Reinig | G02B 27/2235 | 345/633 |
| 2009/0193366 A1* | 7/2009 | Davidson | G06F 3/0482 | 715/863 |
| 2009/0216348 A1* | 8/2009 | Moyne | G05B 13/048 | 700/31 |
| 2009/0323183 A1* | 12/2009 | Takaaki | G03B 35/18 | 359/479 |
| 2010/0107127 A1* | 4/2010 | Han | G06F 3/04815 | 715/848 |
| 2010/0156836 A1* | 6/2010 | Katayama | G01S 5/16 | 345/173 |
| 2010/0315413 A1* | 12/2010 | Izadi | G06F 3/017 | 345/419 |
| 2011/0043702 A1* | 2/2011 | Hawkins | G06F 3/011 | 348/584 |
| 2011/0047459 A1* | 2/2011 | Van Der Westhuizen | G06F 1/1692 | 715/702 |
| 2011/0069019 A1* | 3/2011 | Carpendale | G06F 3/0425 | 345/173 |
| 2011/0128555 A1* | 6/2011 | Rotschild | G02B 27/2271 | 356/625 |
| 2011/0216002 A1* | 9/2011 | Weising | G09G 5/08 | 345/158 |
| 2011/0238079 A1* | 9/2011 | Hannaford | G06F 3/011 | 606/130 |
| 2012/0013613 A1* | 1/2012 | Vesely | G06F 3/011 | 345/419 |
| 2012/0069012 A1* | 3/2012 | Facchin | G01C 11/02 | 345/419 |
| 2012/0102438 A1* | 4/2012 | Robinson | G06F 3/011 | 715/863 |
| 2012/0102439 A1* | 4/2012 | Mitchell | G06F 3/011 | 715/863 |
| 2012/0113140 A1* | 5/2012 | Hilliges | G06F 3/0304 | 345/633 |
| 2012/0113223 A1* | 5/2012 | Hilliges | G06F 3/00 | 348/46 |
| 2012/0117514 A1* | 5/2012 | Kim | G06F 3/011 | 715/849 |
| 2012/0124511 A1* | 5/2012 | Kawakami | G06F 1/1694 | 715/799 |
| 2012/0154281 A1* | 6/2012 | Yamazaki | G02B 27/017 | 345/163 |
| 2012/0162384 A1* | 6/2012 | Vesely | G06T 19/006 | 348/47 |
| 2012/0200495 A1* | 8/2012 | Johansson | G06F 3/011 | 345/156 |
| 2012/0249741 A1* | 10/2012 | Maciocci | G06F 3/011 | 348/46 |
| 2013/0076863 A1* | 3/2013 | Rappel | H04N 13/004 | 348/46 |
| 2013/0194238 A1* | 8/2013 | Sakai | H04N 21/4314 | 345/175 |
| 2013/0207896 A1* | 8/2013 | Robinson | G06F 3/013 | 345/158 |
| 2013/0230837 A1* | 9/2013 | Meglan | G09B 23/28 | 434/262 |
| 2013/0234934 A1* | 9/2013 | Champion | G06F 3/012 | 345/156 |
| 2013/0249786 A1* | 9/2013 | Wang | G06F 3/011 | 345/156 |
| 2013/0257692 A1* | 10/2013 | Yang | G06F 3/04815 | 345/8 |
| 2013/0257748 A1* | 10/2013 | Ambrus | G02B 27/0093 | 345/173 |
| 2014/0002491 A1* | 1/2014 | Lamb | G06F 1/163 | 345/633 |
| 2014/0088941 A1* | 3/2014 | Banerjee | G06F 3/011 | 703/11 |
| 2014/0204002 A1* | 7/2014 | Bennet | G06F 3/011 | 345/8 |
| 2014/0235311 A1* | 8/2014 | Weising | G09G 5/08 | 463/14 |
| 2014/0282267 A1* | 9/2014 | Vogelmeier | G01S 7/20 | 715/852 |
| 2014/0317575 A1* | 10/2014 | Ullmann | G06T 19/20 | 715/852 |
| 2014/0333612 A1* | 11/2014 | Itoh | G09G 3/003 | 345/419 |
| 2015/0124086 A1* | 5/2015 | Melle | G01B 11/002 | 348/136 |
| 2015/0131913 A1* | 5/2015 | Anderson | G06F 3/01 | 382/203 |
| 2015/0264339 A1* | 9/2015 | Riedel | G02B 27/2235 | 348/54 |
| 2016/0004335 A1* | 1/2016 | Hosenpud | G02B 27/00 | 345/157 |
| 2016/0106394 A1* | 4/2016 | Kang | G06F 3/1423 | 600/437 |
| 2016/0370855 A1* | 12/2016 | Lanier | H04N 5/335 | |
| 2017/0108930 A1* | 4/2017 | Banerjee | G06F 3/016 | |

OTHER PUBLICATIONS

Benko H et al., "Cross-dimensional gestural interaction techniques for hybrid immersive environments", Virtual Reality, 2005. Proceedings VR 2005, IEEE Bonn, Germany Mar. 12-16, 2005, Piscataway, NJ, USA, IEEE, Piscataway, NJ, USA, Mar. 12, 2005 (Mar. 12, 2005), pp. 209-216, XP031572880.

Jason Leigh et al., "ImmersaDesk-4 : A High Resolution, High Visual Acuity Desktop Virtual Reality System", Electronic Visualization Laboratory, Nov. 11, 2005 (Nov. 11, 2005), XP55019318.

Mulder J 0 et al., "A modular system for collaborative desktop VR/AR with a shared workspace", Virtual Reality, 2004, Proceedings IEEE Chicago, IL, USA Mar. 27-31, 2884, Piscataway, NJ, USA,IEEE, US, Mar. 27, 2004 (Mar. 27, 2004), pp. 75-288, XP818769858.

FR Search Report, Dated Mar. 22, 2012, in FR1155341.

* cited by examiner

SYSTEM FOR COLOCATING A TOUCH SCREEN AND A VIRTUAL OBJECT, AND DEVICE FOR MANIPULATING VIRTUAL OBJECTS IMPLEMENTING SUCH A SYSTEM

BACKGROUND OF THE INVENTION

The present invention belongs to the field of the representation of virtual objects and their manipulation.

More particularly, the invention relates to a system for visualizing a virtual object and a device enabling an operator to manipulate intuitively at least one virtual object in a precise manner and without the manipulated virtual object being masked by his hands.

DESCRIPTION OF THE RELATED ART

In the field of virtual images, many solutions have been envisaged to date for displaying these images to an observer and, most often in the case of virtual objects in three-dimensional (3D) representation, for carrying out a manipulation of these virtual objects, notably to orient these virtual objects in space.

In the present description, the expression "virtual object" will be used to designate a graphical representation of an object produced by a calculation system. A virtual object may be a representation reproducing the image of a real object or may correspond to an imaginary object. The expression "virtual object" may also designate in a generic manner a set of such elementary virtual objects.

It is possible to carry out the different rotations and translations of a virtual object using conventional control means of a computer generating images of the virtual object, i.e. the keyboard and control buttons, track balls or mice, but these control means, which have been implemented for a considerable time on computer-aided design stations, are tedious to use and lack flexibility for an untrained user.

For a more intuitive manipulation of virtual objects, use has been made of the consideration of movements of the hands via touch sensitive surfaces, either autonomous or placed on screens, via which a virtual object is manipulated in virtual space through suitable digital processing.

However, these solutions remain highly flawed, since the movements of the hands remain limited, notably on the 2D input surface, and consequently remain scarcely representative of the movements that would be carried out on a physical object. Moreover, in the case of an autonomous touch sensitive surface, there is no visual correlation between the movements of the object and those of the hands and, in the case of a touch sensitive surface placed on a screen on which the virtual object is represented, the hands mask the object displayed on the screen, not permitting a precise manipulation.

To improve the conditions for manipulating virtual objects by overcoming these constraints, other solutions have been envisaged such as, for example, enhanced virtual reality solutions in which images, for example representing the hands of the user and their movements, originating from a real scene, are inserted into the scene of the virtual object to be manipulated. In these cases, it is necessary to detect the movements of the hands in space and, during the manipulation, the user of the device cannot see his hands when he manipulates the virtual object, but must concentrate on a virtual representation of his hands, which proves to be scarcely physiological and requires adaptation efforts on the part of the user.

In an improved form of an enhanced virtual reality device, described in the patent application published under number FR 2947348, the user observes his image in a semitransparent surface overlaid on the image of the virtual object placed behind the semitransparent surface and appearing in the reflection of a three-dimensional manipulation device placed between the hands of the user. Thus, the user implements movement controls in direct relation to the representation of the virtual object. However, here also, the user does not directly visualize his hands, but only their reflections and the movement controls applied to the virtual object remain relatively abstract and arbitrary.

SUMMARY OF THE INVENTION

The object of the present invention is to improve the convenience of an operator who has to manipulate virtual objects by offering him ergonomic means with intuitive operation wherein he retains a direct view of his hands by means of which he manipulates the virtual object.

The system according to the invention for visualizing a virtual object comprises, on a workstation:
  a secondary screen for displaying images of the virtual object;
  a primary screen for displaying images and/or text;
  optical means for simultaneous visualization, by an operator of the workstation, of images displayed on the secondary screen and images and/or text displayed on the primary screen;
  a device, associated with the primary screen, for detecting contact points of one or more physical elements for pointing on a pointing surface of this detection device;
  the detection device being located between the secondary screen and the primary screen.

Thus, according to this arrangement, the operator of the workstation observes directly in his field of vision the images of the virtual object on the secondary screen, the images and/or texts presented on the primary screen and his hands used as physical elements for pointing through contact on the pointing surface.

In a preferred manner, the optical means are arranged so that an image displayed on the secondary screen appears, seen by an operator using the workstation, above the primary screen and the pointing surface of the detection device. Thus, at least for an average observation position, all the points of the image of the virtual object displayed on the secondary screen coincide with usable pointing areas of the pointing surface associated with the primary screen.

Similarly in a preferred manner, the system according to the invention is designed so that the length of the optical path between an observation point and a point on the secondary screen, observed according to a given direction, is less than the length of the optical path between said observation point and a point on the primary screen, observed according to the same direction, in such a way that, through visual accommodation, the operator can concentrate on one or the other of the images and/or text displayed on the two screens.

In one advantageous embodiment, the optical means mainly comprise a transparent panel, which is semi-reflective on at least one of its surfaces, disposed between the secondary screen and the primary screen in such a way that an operator of the workstation visualizes images displayed on the secondary screen through reflection on the semi-reflective surface of the transparent panel and visualizes images displayed on the primary screen by way of transparency through the transparent panel. The arrangement of the angles of orientation of the screens and of the panel, as well as the distances between the screens and the panel enables the implementation of workstations suitable for many requirements without particular technological difficulty and at low production cost.

To overcome the possibility of movement of the head of the operator on the workstation and to avoid imposing on him a fixed position of the head when he performs his manipulations, the system advantageously comprises a system for detecting at any time, in a reference system of the workstation, the position of the observation point from which the operator using the workstation looks at the screens.

In a preferred form, the system also comprises a system for observing stereoscopic images when such stereoscopic images are displayed on the secondary screen and/or on the primary screen to improve the realism of the images of the virtual object or other displayed images.

The invention also relates to a device for the manipulation of at least one virtual object by an operator, such a device comprising calculation means and a system according to the invention in which the calculation means generate the image of the virtual object displayed on the secondary screen according to contact information received from the detection device associated with the primary screen in such a way that the operator controls the representation of the virtual object through manual actions on the pointing surface sensitive to the contacts of the fingers.

In order to guide the operator in his manipulations and at each time give him ergonomic controls suitable for the possible actions, symbolic controls are calculated and displayed on the primary screen to provide the actions which can be carried out on the detection device to work on the representation of a virtual object or of elements of a virtual object displayed on the secondary screen.

The symbolic controls are preferably displayed on the primary screen according to the apparent position for the operator of the image of the virtual object, calculated by the calculation means by measuring the position of the observation point transmitted to the calculation means, to retain the apparent relative positions of the symbolic controls in relation to the virtual objects to which they relate and thus retain the natural and intuitive appearance of the controls.

In order to maintain the apparent relative position of the images of the virtual object on the secondary screen with the images displayed on the primary screen, in particular symbolic controls, when the observation point is moved according to a movement of the head of the operator, the calculation means receive, from a device for measuring the observation point, the position of this observation point in the reference system of the workstation, or determine an observation point on the basis of information or measurements transmitted from the workstation, and modify the positions of the images on the screens, preferably only the position of the image of the virtual object on the secondary screen, in order to maintain them in the same relative positions seen by the operator.

In this case, the calculation means preferably determine an image from the virtual object, taking into account the movement of the head, which is likely to modify its appearance, in particular when the virtual object is represented in three dimensions.

In order to offer all the benefits of the device in terms of manipulation of a virtual object, the calculation means advantageously generate stereoscopic images from the virtual object displayed on the secondary screen, and preferably in such a way that the obtained perception in relief positions the image of the observed virtual object with the stereoscopic vision system between firstly the observer and secondly his hands and the primary screen.

In order to enable the visualization of the virtual object according to all the spatial directions in relation to the virtual object, the device generates on the secondary screen images obtained from a three-dimensional representation of the virtual object.

The display capacities of the primary screen are advantageously used to display general information and context menus enabling an operator to carry out instructions for the management of his activity on the workstation and to consult information that may be useful or necessary to him, for example information extracted from a database consulted in real time by the operator.

BRIEF DESCRIPTION OF THE DRAWING FIGURES

The detailed description of one embodiment of the invention is given with reference to the figures, in which.

DETAILED DESCRIPTION OF THE INVENTION

Figure 1:
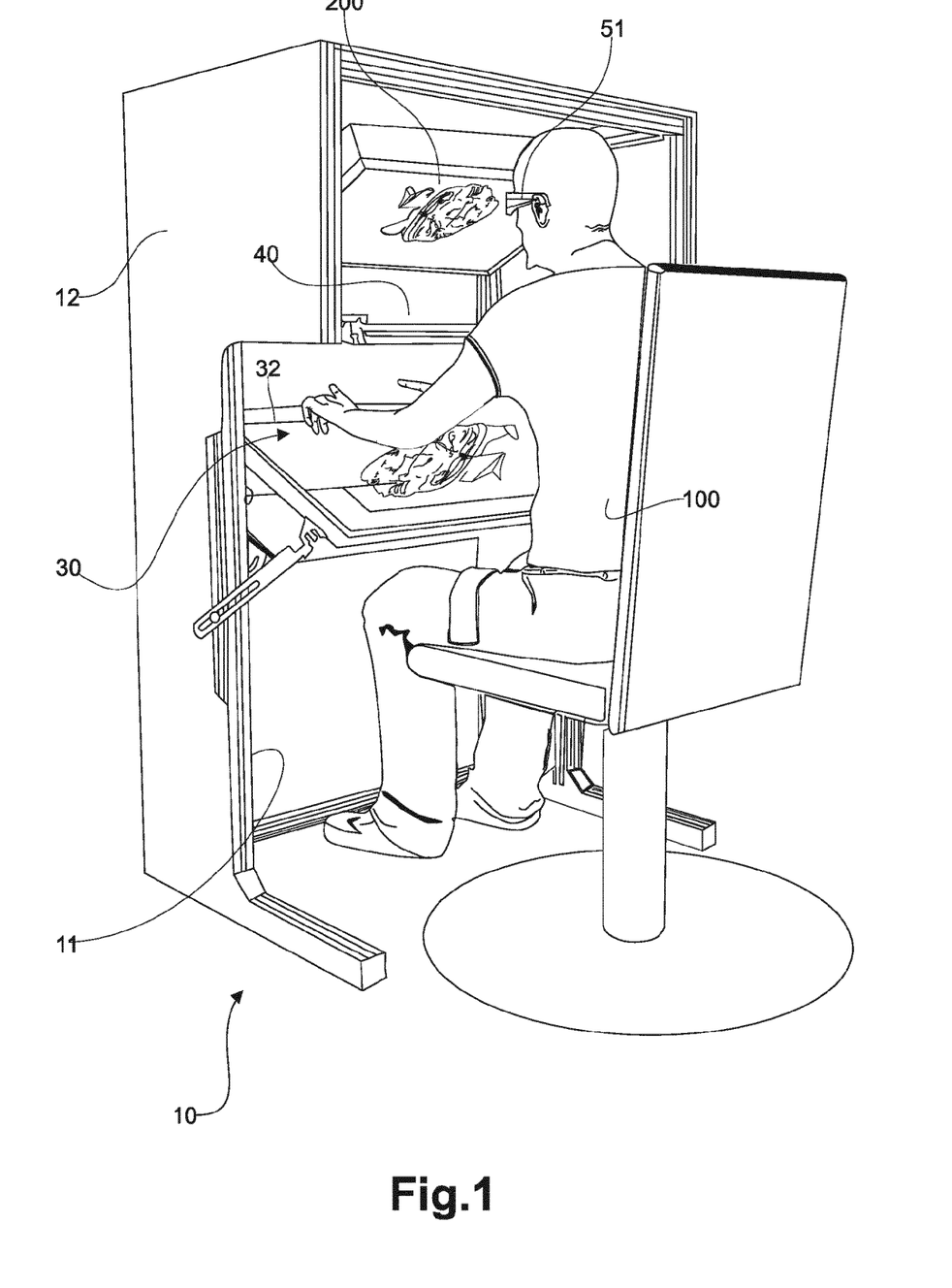
FIG. 1 shows a perspective view of the system according to the invention incorporated into a workstation for an operator.
Figure 5:
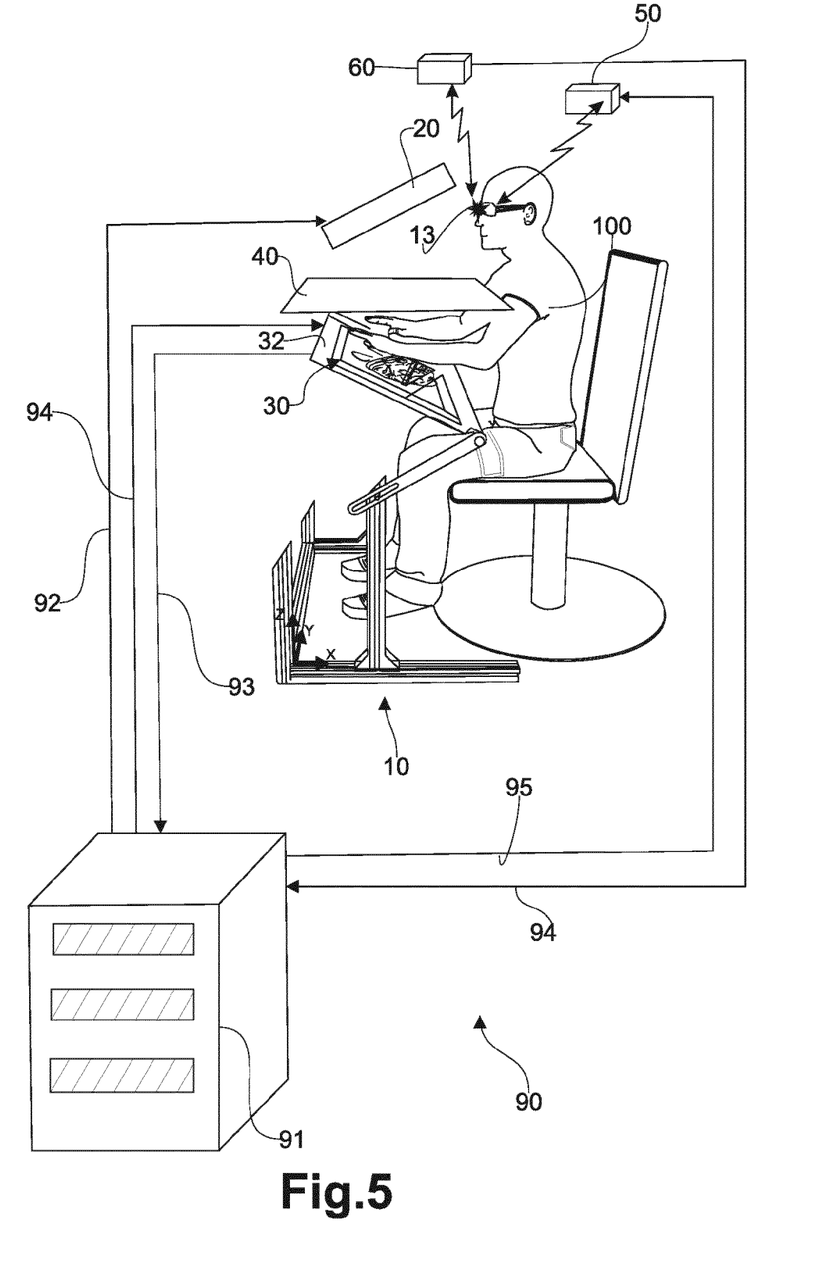
FIG. 5 shows a basic diagram of a device implementing the system.

FIG. 1 shows a system 10 according to the invention for visualizing a virtual object 200, combining display and control interfaces, in the form of a workstation for an operator 100, and FIG. 5 shows schematically a device 90 for the manipulation of virtual objects comprising the system 10 shown in FIG. 1.

The system 10 forms an interface of the device 90 for manipulating one or more virtual objects which may be two-dimensional objects or three-dimensional objects.

The workstation shown in FIG. 1 is a non-limiting example of a workstation ergonomics of the system 10 and shows a functional experimental prototype having enabled the implementation of the invention.

The workstation mainly comprises:
- a secondary screen 20 for displaying images of a virtual object on a display surface of said secondary screen;
- a primary screen 30 for displaying images and/or text on a display surface of said primary screen;
- a device for detecting contact points of an object, associated with the primary screen 30, for detecting contact positions of physical means for pointing on a pointing surface 32 of said detection device;
- a transparent panel 40, which is also semi-reflective on at least one of its surfaces;
- in a preferred embodiment, a stereoscopic visualization device 50 for observing a displayed image in order to represent the binocular point of view of an operator, for example by means of occultation glasses 51 worn by the operator 100;
- also in a preferred embodiment, a system 60 for determining, in a reference or reference system of the workstation, a position representing the point of observation 13 by the operator 100.

In the example shown, the workstation also comprises struts 11 and other structures supporting the different functional elements and fittings 12 of these struts and structures in order to isolate the workstation from ambient interferences, and in particular ambient lighting which may adversely affect the readability of the generated images of the virtual object, as will be clearly understood from the description which follows.

The expression "virtual object" is to be understood here in the broad sense and may involve a single shape or a set of shapes which can each be manipulated separately or in sub-sets or in their entirety.

Figure 2:
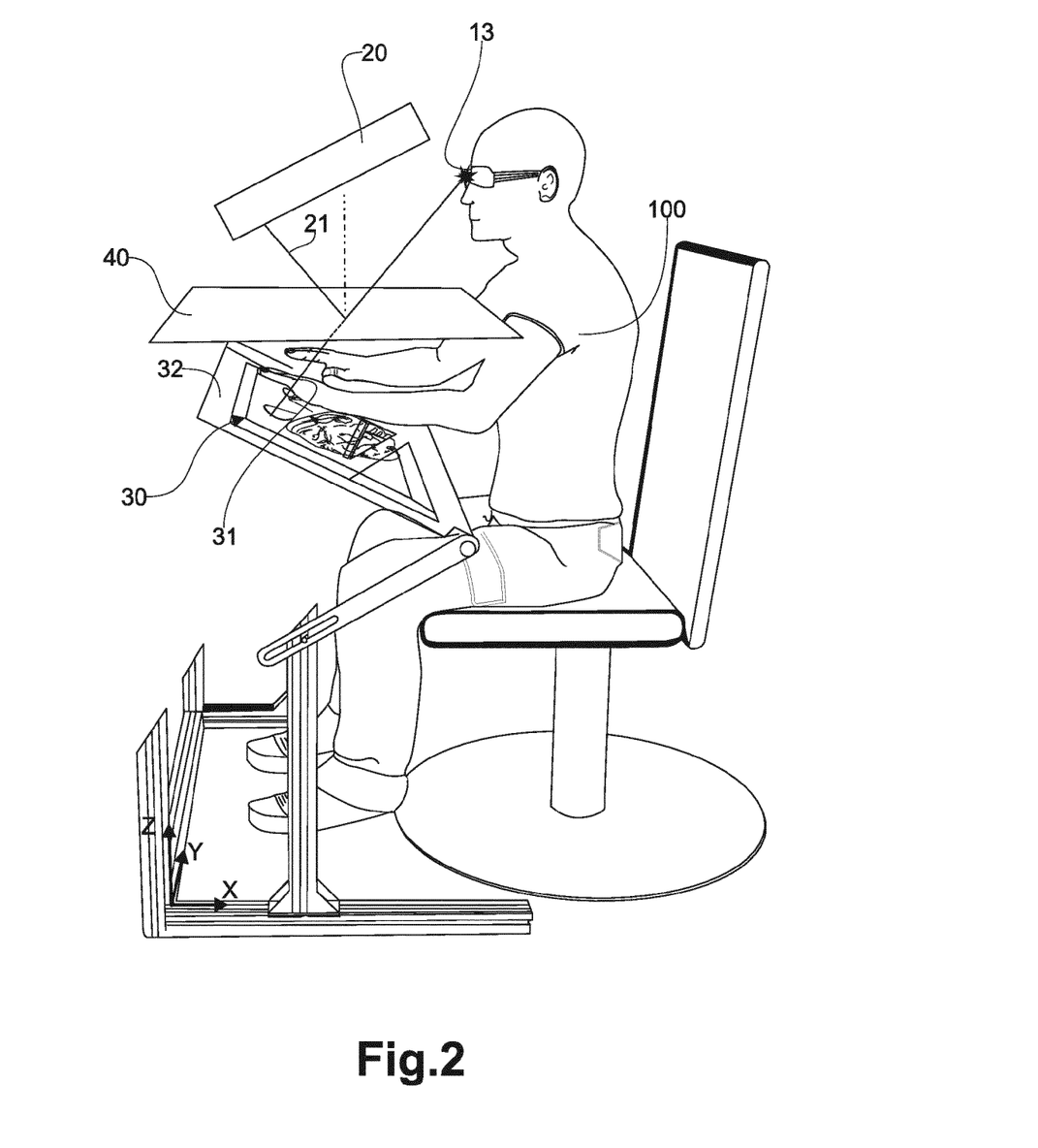
FIG. 2 shows a partially cutaway view of the system shown in FIG. 1.

FIG. 2 shows the workstation 10 shown in FIG. 1 without showing the support struts 11 and fittings 12 of said workstation.

As is evident from this FIG. 2, the secondary screen 20, the primary screen 30 and the transparent panel 40 are arranged in such a way that the transparent panel is placed between the secondary screen and the primary screen and in such a way that the display surfaces of the secondary and primary screens are oriented towards the transparent panel.

Furthermore, the relative orientations and positions of these three elements of the system 10 are such that the display surface of the secondary screen 20, seen by the operator 100 through reflection on the transparent panel 40 from an average position of an observation point 13 of the workstation 10, coincides more or less in the field of view of the operator with the display surface of the primary screen 30, seen from the same observation point through the transparent panel 40.

For example, the choice of the positions and orientations enables prioritization of a reflection of the screen 20 parallel to the screen 30 to ensure parallel movements of the images on the two display surfaces 20 and 30, or prioritization of a greater visualization volume by increasing the angle of orientation of the screen 20 in relation to that of the screen 30.

Thus, when an observer 100 is in position on the workstation, each point on the secondary screen 20, and therefore of an image of a virtual object displayed on said secondary screen, is observed in overlay with a point on the primary screen 30 according to a one-to-one relationship.

This apparent overlay, in accordance with the laws of geometric optics, is illustrated by the representation of a "display screen-observation point" optical path 21, which undergoes a reflection on the transparent panel 40, and a "primary screen-observation point" optical path 31, which crosses the transparent panel 40, optical paths of which the common path between the transparent panel and the observation point 13 determines the common direction in which the two points are observed.

Furthermore, as shown in FIGS. 1 and 2, the pointing surface 32 is placed in relation to a station of the operator 100, advantageously a seated station for reasons of tiredness when said operator must carry out work of a long duration, in such a way that the operator can place one or more fingers, used as physical pointing means, on said pointing surface associated with the primary screen 30, and the transparent panel 40 is placed in such a way that the operator observes his hands on the pointing surface 32 and the primary screen 30 through the transparent panel 40.

For an operator in a conventional seated position, the arrangement obtained therefore corresponds from the bottom upward to the primary screen 30, the pointing surface 32 overlaid on the display surface, then the transparent panel 40 and finally the secondary screen 20 of which the display surface is oriented mainly downward.

The display surface of the primary screen 30 is oriented mainly upward, but is preferably inclined in such a way that a line perpendicular to said display surface in the center of said primary screen determines the direction of the observation point 13 in such a way as to present an optimum visibility of the primary screen 30 for the operator.

According to this arrangement of the elements of the device, the effect obtained for the operator is a direct view of his hands 101 through the transparent panel 40, his hands being overlaid on the detection surface 32 and on the primary screen 30 of which the images displayed on said primary screen are placed under his hands, and a simultaneous and colocated view of the images of the virtual object displayed on the secondary screen 20, above his hands, reflected by the transparent panel 40, which prevents the hands of the operator from masking from him the images which are on this said secondary screen.

The secondary screen, the primary screen, the pointing surface and the transparent panel are of conventional technologies.

Thus, the secondary screen 20 is advantageously a conventional screen for the display of images generated by an electronic device, for example a video screen or computer screen, using liquid-crystal or plasma technology, and producing images of sufficient brightness to be observed in reflection on the transparent panel.

The transparent panel 40 is, for example, a panel made from an optical-quality glass and with a refractive index or treatment giving it reflection qualities on at least one of its surfaces turned in the direction of the secondary screen, for the angles of incidence considered, necessary for a good visibility of the secondary screen 20, without generating excessive weakening of the objects and images observed through transparency.

The primary screen 30 is a screen for displaying images, the technology of which may be similar to that of the secondary screen, and associated with a device for detecting contact points on the pointing surface 32. In one embodiment of the device for detecting contact points, the pointing surface 32 is placed more or less on the surface of the primary screen 30 on which an image and/or text can be displayed to form a touch screen.

Touch screens of this type, which enable the correlation of a contact area and a representation on a screen, are in widespread use today and employ different technologies (resistive, capacitive, infrared, etc.) for the pointing surface according to the models.

The touch screen advantageously belongs to a model for simultaneous detection of multiple contacts, referred to as "multi-touch", which is capable of detecting and characterizing the presence on the touch screen detection surface of two or more contacts of objects, such as, for example, a plurality of fingers of an operator.

For its implementation, the system 10 is incorporated into a device 90 for manipulating virtual objects which furthermore comprises calculation means 91 for generating at least one virtual representation of an object, to produce an image of the object and transmit 92 this image to the secondary screen 20, to acquire information from the detection device relating to contacts 93 on the pointing surface 32 of the primary screen and to process these contacts which must be interpreted as controls and also to generate and display information 94 in the form of images and/or text on the primary screen 30.

The calculation means 91 are known means not shown here in detail, comprising processors, memories and management interfaces, preferably oriented for real-time calculations of images, and are programmed to carry out processing operations according to the application to which the device is dedicated.

The transformation of objects in digital form, generally referred to as virtual objects, and the algorithms implemented for these transformations are known today in many applications and will not be described in detail here as such.

From the laws of geometric optics already mentioned, it appears that, in the system 10 described, each point on the secondary screen 20 coincides for an observer to a point on a plane of the primary screen 30. However, this coincidence established for a position of the observation point 13 is different if the observation point is modified. Consequently, when the operator moves his observation point 13 by moving his head, with everything else otherwise unchanged, images displayed in a fixed manner on the secondary screen and those on the primary screen move visually in relation to one another.

In order to avoid this effect, a first solution consists in maintaining the head of the operator 100 in a fixed position imposed in the reference system of the workstation. However, this solution is restrictive and, in a preferred, more ergonomic solution, a system 60 is implemented for determining the position of the observation point in a coordinate system used as a reference system of the workstation.

A determination system of this type comprises, for example, sensors which enable the calculation, on the basis of measurements in the reference system of the workstation, of a position at each time of the observation point from which the operator observes the screens. In this case, the measured position of the observation point is transmitted 94 to the calculation means 91 which generate the displayed images and which modify the position of the virtual object on the secondary screen 20 and/or the elements displayed on the primary screen 30 in such a way that the relative positions of the images displayed on these two screens appear immobile in relation to one another when the operator 100 moves his head and therefore moves his observation point, at least for the elements whose relative position is intended to be maintained.

In practice, it will be preferred to move only the image of the virtual object on the secondary screen 20. In fact, the fingers of the operator 100 used as a physical pointing system on the pointing surface 32 perform the controls applied to the virtual object 200 according to graphical representations on the primary screen and, with everything else otherwise fixed, it is not desirable for the graphical representations on the primary screen 30 to move in this case.

Two application examples are described in detail below to illustrate uses of the device.

Figure 3:
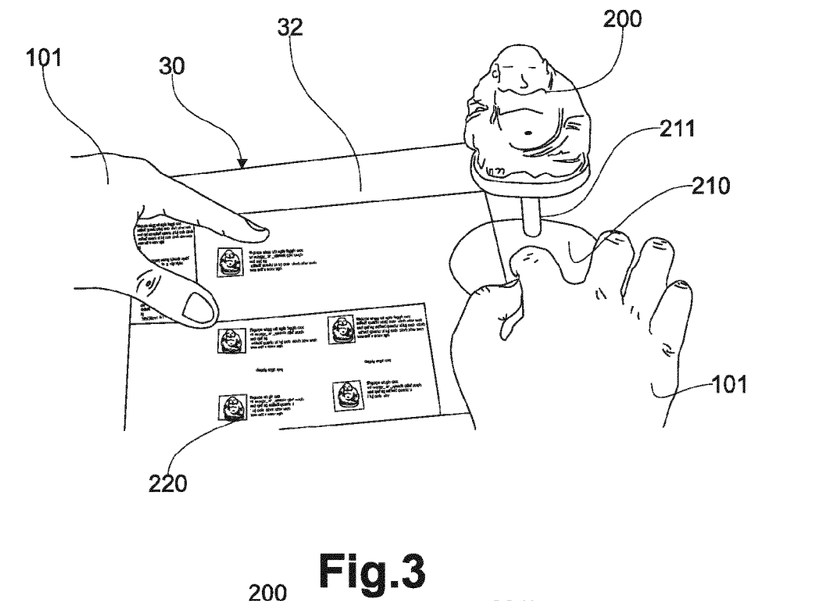
FIG. 3 shows an example of a virtual object observed in the system.

FIG. 3 shows the visual perception of an observer at the workstation.

In the case illustrated, the virtual object 200 is a three-dimensional statuette, the image of which, generated by the device 90 for the virtual object manipulation, appears in overlay above the primary screen 30 and the hands 101 of the operator. The virtual statuette is, for example, obtained by implementing a digital representation of a real statuette which may be, for example, a fragile object which is intended to be subjected to minimal subsequent manipulations.

Simultaneously with the display of the three-dimensional statuette on the secondary screen 20 and observed in FIG. 3 through reflection on the transparent panel 40, information is displayed on the primary screen 30, information observed through the transparent panel 40.

In the example shown in FIG. 3, two types of information are displayed in relation to the virtual object 200. On the one hand, control information 210 corresponding to controls to manipulate the virtual object 200, here the virtual statuette, i.e. move the statuette, modify the orientation of the statuette in space and enlarge or reduce the apparent dimensions of the statuette (zoom effect). On the other hand, general information 220 that the observer may have cause to consult.

The control information 210 is presented in the form of symbolic objects, on which objects the operator 100 interacts with his fingers through contacts with the pointing surface 32 overlaid on the primary screen 30. These symbolic objects represent, for example, the different axes of movement of the object and of rotation of the object. These symbolic objects displayed on the primary screen 30 move in order to follow the apparent movements of the virtual object 200 when the latter is transformed by the actions of the operator and, in the case illustrated, are presented as connected to the virtual object by a symbolic link 211 having the shape of a virtual bar which is generated with the virtual object and displayed on the secondary screen 20.

In the example illustrated, the general information 220 is information from a database, either local or remotely accessible via an Internet or other network, relating to the statuettes in the style of the statuette represented by the virtual object 200 in such a way that the operator can navigate, advantageously via the touch functions of the detection device associated with the primary screen, in the database and compare the statuette in real time, in all its aspects by orienting the latter in space as he wishes and by enlarging the details that he wishes to examine, with the information available in the database.

Thus, when the operator uses the device 90 for manipulating virtual objects, he generates instructions via the detection device associated with the primary screen 30 on which his hands 101 are overlaid, which corresponds to the conventional operation of a touch screen and allows him to implement the controls in a direct and intuitive manner without the need to use a virtual pointer, but without his hands 101 adversely affecting the observation of the virtual object 200 of which the image is overlaid on his hands.

It will be noted here that the hands are potentially visible through the image of the virtual object, and that the visibility of the hands is more or less weakened according to parameters checked in the design of the workstation, such as, for example, the transmission and reflection coefficients of the transparent panel, and parameters fixed or checked during the use of the workstation, insofar as adjustment controls are provided, such as the brightness and density of the images of the virtual object displayed on the secondary screen 20 and the lighting conditions of the hands.

In a preferred embodiment, the optical distances between the observation point 13 and the secondary screen 20 on the one hand and the observation point 13 and the primary screen 30 on the other hand are, by geometric design, different in such a way that the operator accommodates his view to look at either the virtual object 200 or the information displayed on the primary screen 30. This arrangement of the device allows the operator to concentrate on the elements of one or the other of the screens, for example on the virtual object, without being distracted by the elements displayed on the primary screen which do not arouse his interest at a given time, while allowing rapid "switchovers" from one screen to the other through simple visual accommodation.

Figure 4:
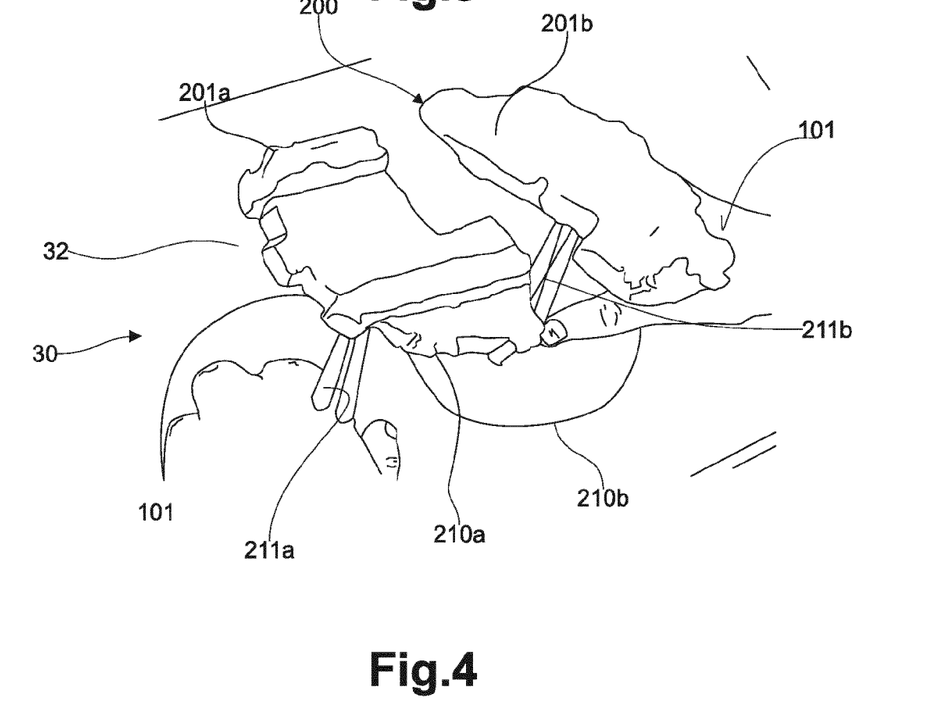
FIG. 4 shows a different example of a virtual 3D object with a display in relief observed in the system.

In the case shown in FIG. 4, the virtual object 200 is formed from two distinct three-dimensional elements 201a, 201b, said two elements here being the virtual representations of two fragments of the same real object and presenting a characteristic of a more or less extensively damaged break, a situation which is often encountered in the field of archaeology.

In this example, for which the perception of the relief is active, the virtual object 200 is displayed in stereoscopic mode in order to be observed with a relief effect by means of observation glasses 51 associated with a stereoscopic visualization device 50 synchronized 95 with the displayed images generated by the calculation means 91. This type of stereoscopic display enabling a view in relief is well known and consists in producing a different image on the secondary screen 20 for each of the eyes of an observer, by taking into account the differences linked to the points of view of each eye, and in presenting to each eye the image which corresponds to its point of view by means of occultation glasses, as shown in FIG. 5, or by other means such as, for example, color filters.

For this reason, the representation shown in FIG. 4, originating from a photograph, shows the two "right eye" and "left eye" images, overlaid and therefore with a duplication of some parts of the image, for example very marked on the symbolic links 211a, 211b which associate each element 201a, 201b respectively of the virtual object 200 with the symbolic elements of the control information 210a, 210b respectively, displayed on the primary screen 30.

In this application example, the operator can select via a selection menu, not visible in FIG. 4, on the primary screen, one or the other of the elements 201a, 201b of the object in order to manipulate in space the virtual three-dimensional object by benefiting from the relief view, the aim here being to reconstruct the broken object and check the quality of the virtual reconstruction.

In this case of visualization in relief, the perception distance of the virtual object introduced by the stereoscopic effect is preferably chosen so that the user 100 perceives the virtual object 200 as if said visualized object was floating above the primary screen 30 and his hands 101.

The system 10 and the device 90 for the manipulation of virtual objects are capable of assuming various shapes without departing from the present invention, for example in order to respond to objectives of ergonomics of a workstation differing from those of the workstation described in a detailed manner, or in order to perform operations on virtual objects differing from those described for simple cases by way of example.

For example, the system 10 may comprise more than one secondary screen or more than one primary screen, or may also comprise physical controls visible to the operator through the transparent panel.

Furthermore, the transparent panel is only one example of optical means for the simultaneous visualization, in the field of view of an operator of the workstation, of images displayed on the secondary screen and on the primary screen, and other optical systems, for example using optical fibers or mirrors and producing the same effect, may be implemented.

The device and the system according to the invention therefore enable manipulation of one or more two-dimensional or three-dimensional virtual objects in a perfectly natural manner for an operator by acting manually on controls closest to the virtual object, by retaining the operator's hands and the manipulated virtual object in the operator's field of view, but without the hands masking the object, and where appropriate, additional information useful to the operator.

The device and the system according to the invention are advantageously implemented as a means of assistance in many fields in which it is useful to manipulate objects, but where it is not always possible or desirable to carry out these manipulations on real objects due to their size, their fragility, their weight, their hazardous nature, etc.

As well as the field of archaeology or antiquities corresponding to the examples described in detail, these situations occur, for example, in the field of medicine, architecture, the nuclear industry, etc.

The invention claimed is:

1. A system (10) for visualizing at least one virtual object (200) having a workstation, the system comprising:
   a primary screen (30) for electronically displaying images and/or text;
   a secondary screen (20) for electronically displaying images of the at least one virtual object (200);
   a detection device for detecting contact points of one or more physical elements for pointing on a pointing surface (32) of said detection device, the pointing surface (32) being associated with the primary screen (30); and
   optical means for simultaneous and colocated visualization handling a viewing of said images displayed of the at least one virtual object on the secondary screen (20) and images and/or text displayed on the primary screen (30), the optical means comprising a transparent semi-reflective panel (40) with a semi-reflective surface,
   wherein the workstation maintains fixedly, each relative to one another:
   the primary screen (30),
   the secondary screen (20), and
   the transparent semi-reflective panel (40) of the optical means, located above the one or more physical elements for pointing on a pointing surface (32) of said detection device and disposed between the secondary screen (20) and the primary screen (30) and oriented in such a way that an operator (100) of the workstation visualizes, from an observation point (13) between the secondary screen (20) and the primary screen (30), simultaneous and colocated images of the virtual object (200) displayed on the secondary screen (20) through reflection of said images of the virtual object (200) displayed on the secondary screen (20) on the semi-reflective surface of the transparent semi-reflective panel (40) and visualizes images and/or text displayed on the primary screen (30) by way of transparency through the transparent panel (40) such that an operator of the system visualizes images displayed on the secondary screen through reflection on the semi-reflective surface of the transparent semi-reflective panel (40) and visualizes images displayed on the primary screen by way of transparency through the transparent semi-reflective panel (40) and also with the operator placing one or more fingers on the physical elements for pointing on the pointing surface (32) associated with the primary screen (30), the operator observes the hand on the pointing surface (32) and the primary screen (30) through the transparent semi-reflective panel (40),
   wherein the pointing surface (32) of the detection device is located between the secondary screen (20) and the primary screen (30) and to be seen through the transparent panel (40).

2. The system as claimed in claim 1, in which an image of a virtual object (200) displayed on the secondary screen (20) appears visually on the transparent semi-reflective panel (40), for an operator (100) using the workstation, overlaid the primary screen (30).

3. The system as claimed in claim 2, in which an optical path between an observation point (13) and a point on the secondary screen (20) observed according to a given direction has a length less than a length of an optical path between said observation point and a point on the primary screen (30) observed according to the same direction.

4. The system as claimed in claim 1, comprising a system for determining (60) a position, in a reference system of the workstation, of an observation point (13) of an operator (100) using the workstation.

5. The system as claimed in claim 1, comprising one or more systems for observing (50) stereoscopic images when such stereoscopic images are displayed on the secondary screen (20) and/or on the primary screen (30).

6. A device (90) for manipulation of at least one virtual object (200) by an operator (100), comprising a system (10) as claimed in claim 1 and calculation means (91) including processors, memories and management interfaces, in which device the calculation means (91) generate images of the at least one virtual object (200) displayed on the secondary screen (20) according to contact information received from the detection device associated with the primary screen (30).

7. The device (90) for the manipulation of at least one virtual object as claimed in claim 6, in which symbolic controls (210, 210a, 210b) are calculated and displayed on the primary screen (30) to provide actions which can be carried out on the detection device to work on a representation of a virtual object (200) or of elements (201a, 201b) of a virtual object displayed on the secondary screen (20).

8. The device (90) for the manipulation of at least one virtual object as claimed in claim 7, in which the symbolic controls (210, 210a, 210b) are displayed on the primary screen (30) according to the apparent position for the operator (100) of the image of the virtual object (200) to retain the apparent relative positions of said symbolic controls in relation to the virtual object to which they relate.

9. The device for the manipulation of at least one virtual object as claimed in claim 8, comprising a system for determining (60) a position, in a reference system of the workstation, of an observation point (13) of an operator (100) using the workstation, in which an image or images of the virtual object (200) displayed on the secondary screen (20) and an image or images displayed on the primary screen (30) are moved relatively in relation to one another according to a measured or calculated position of the observation point (13) in order to retain the same relative positions between said images seen by the operator (100).

10. The device for the manipulation of at least one virtual object as claimed in claim 6, in which said device generates stereoscopic images from a virtual object (200) displayed on the secondary screen (20).

11. The device for the manipulation of at least one virtual object as claimed in claim 10, in which the stereoscopic images are generated in such a way that the virtual object (200), observed using a system (50) for observing stereoscopic images, appears to the operator (100) in front of his hands and the images of the primary screen.

12. The device for the manipulation of at least one virtual object as claimed in claim 6, in which said device generates, from a virtual object (200) displayed on the secondary screen (20), images obtained from a three-dimensional representation.

13. The device for the manipulation of at least one virtual object as claimed in claim 6, in which said device displays information extracted from databases on the primary screen (30).

14. The system (10) as claimed in claim 1, wherein,
the secondary screen (20) is located vertically over the primary screen (30) with the semi-reflective panel (40) disposed below the secondary screen (20) and above the primary screen (30), and
the detection device is located below the semi-reflective panel (40) and above the primary screen (30).

15. The system (10) as claimed in claim 14, wherein,
the secondary screen (20) is a computer screen,
the primary screen (30) is a video screen, and
the pointing surface (32) of the detection device is on a surface of the primary screen (30) on which the image and/or text is displayed, the primary screen (30) and the pointing surface (32) forming a touch screen.

\* \* \* \* \*